(12) United States Patent
Powell (10) Patent No.: US 9,922,180 B2
(45) Date of Patent: *Mar. 20, 2018

(54) BARCODE READER AND BARCODE READING SYSTEM HAVING AN AGE VERIFICATION CAPABILITY

(71) Applicant: The Code Corporation, Draper, UT (US)

(72) Inventor: George Powell, Draper, UT (US)

(73) Assignee: The Code Corporation, Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/377,960

(22) Filed: Dec. 13, 2016

(65) Prior Publication Data

US 2017/0091432 A1  Mar. 30, 2017

Related U.S. Application Data

(63) Continuation of application No. 14/659,378, filed on Mar. 16, 2015, now Pat. No. 9,552,505.

(51) Int. Cl.
*G06K 5/00* (2006.01)
*G06F 21/31* (2013.01)
(Continued)

(52) U.S. Cl.
CPC ........... *G06F 21/31* (2013.01); *G06K 7/1413* (2013.01); *G06K 19/06028* (2013.01)

(58) Field of Classification Search
CPC .... G06Q 20/4014; G06Q 20/32; G06Q 20/40; G06Q 20/40145; G06Q 30/0607; G06Q 20/341; G06Q 30/06; G06Q 30/0609; G06Q 10/00; G06Q 20/20; G06Q 20/3224; G06Q 20/382; G06Q 20/401; G06Q 30/02; G07F 17/3241; G07F 17/3225; G07F 17/329; G07F 7/08; G07F 7/1008; G07F 9/026; G07F 17/32; G07F 17/3237;
(Continued)

(56) References Cited

U.S. PATENT DOCUMENTS 6,196,460 B1 * 3/2001 Shin .......................... G07F 7/08
235/380
7,191,941 B1 * 3/2007 Mollett ................... G06Q 30/04
235/381

(Continued)

*Primary Examiner* — Thien M Le
(74) *Attorney, Agent, or Firm* — Timothy P. O'Hagan; Ray Quinney & Nebeker (57) ABSTRACT

A barcode reader and a barcode reading system having an age verification capability are disclosed. The barcode reader may capture a barcode pattern on an identification (ID) card of an individual presented within a field of view of the barcode reader, extract date of birth information from the barcode, and verify an age of the individual. The barcode reader may provide an approve signal if it is verified that the age of the individual is greater than a high threshold or a deny signal if it is verified that the age is less than a low threshold. The low threshold is distinct from the high threshold. The age may be verified by a host computer. The barcode reader may extract a product ID and send the product ID to the host computer. The host computer may then prompt age verification operation if the product is an age-restricted product.

17 Claims, 8 Drawing Sheets

(51) Int. Cl.
*G06K 19/06* (2006.01)
*G06K 7/14* (2006.01)

(58) Field of Classification Search
CPC .. G07F 17/3258; G07F 17/326; G07F 7/0833;
G07F 7/12; G07F 7/122; G07F 7/127;
G06K 5/00
USPC ........................................................ 235/380
See application file for complete search history.

(56) References Cited

U.S. PATENT DOCUMENTS

| | | | |
|---|---|---|---|
| 8,511,551 B1* | 8/2013 | Foster | B42D 25/00 |
| | | | 235/380 |
| 2005/0125363 A1* | 6/2005 | Wilson | G06Q 20/20 |
| | | | 705/75 |
| 2008/0121688 A1* | 5/2008 | Harrop | G06K 19/06028 |
| | | | 235/375 |
| 2009/0157515 A1* | 6/2009 | Lafauci | G06Q 10/06 |
| | | | 705/15 |
| 2011/0210168 A1* | 9/2011 | Haibara | G06Q 30/06 |
| | | | 235/375 |
| 2013/0072280 A1* | 3/2013 | Yacenda | G07F 17/3225 |
| | | | 463/17 |

* cited by examiner

| Age Verification File | | | | | MM/DD/YYYY | | | |
|---|---|---|---|---|---|---|---|---|
| Last Name | First Name | Mid. Name | Lic. No. | D.O.B. | Age | D.O.E. | Gender | Date | Time |
| | | | | | | | | | |
| | | | | | | | | | |
| | | | | | | | | | |
| | | | | | | | | | |

BARCODE READER AND BARCODE READING SYSTEM HAVING AN AGE VERIFICATION CAPABILITY

CLAIM OF PRIORITY

This application is a continuation of U.S. patent application Ser. No. 14/659,378, titled "BARCODE READER AND BARCODE READING SYSTEM HAVING AN AGE VERIFICATION CAPABILITY," filed Mar. 16, 2015, with inventor George Powell.

TECHNICAL FIELD

This application is generally related to a barcode reader and a barcode reading system having an age verification capability.

BACKGROUND

A barcode is an optical machine-readable representation of information. Devices for identifying or extracting information from barcodes are generally referred to as barcode readers. A laser-based barcode reader (a barcode scanner or laser scanner) includes a laser or other illumination source generating a very narrow illumination beam, a mirror or other optic system for moving illumination beam across a barcode pattern, and a photo sensor which senses, and generates a signal indicated of, the differential in the quantity of the illumination beam that is reflected from the reflective (e.g. white) portions of the barcode pattern and the non-reflective (e.g. black or dark) portions of the barcode pattern. A decoder processes the signal from the photodetector and extracts the information contained in the barcode (e.g. decoded data). An image-based barcode reader includes a camera for capturing an image of a barcode pattern. The camera includes a focusing lens that focuses light reflected from a target area onto a photo sensor array. Once an image of a barcode pattern has been captured by the camera, a decoder processes the image and extracts the information contained in the barcode.

SUMMARY

In accordance with one embodiment, there is provided a barcode reader. The barcode reader, either a laser-based barcode reader or an image-based barcode reader, may include a barcode detection system configured to capture a barcode pattern on an identification (ID) card of an individual presented within a field of view of the barcode reader; a decoder configured to generate decoded data from the barcode pattern and extract date of birth information from the decoded data; and a processor configured to verify an age of the individual from the date of birth information, and provide either: an approve signal if it is verified that the age of the individual is greater than a high threshold; or a deny signal if it is verified that the age of the individual is less than a low threshold, the low threshold being distinct from, and less than, the high threshold.

Additionally or alternatively, the processor may be configured to provide a signal indicating a request for manual verification of an age of the individual on a condition that it is verified that the age of the individual is between the low threshold and the high threshold. Additionally or alternatively, the processor may be configured to provide a signal indicating a request for manual verification of an age of the individual or the deny signal on a condition that the processor cannot verify the age of the individual from the decoded data.

Additionally or alternatively, the barcode reader may include a real time clock for maintaining a current date value, wherein the processor may verify the age of the individual based on the real time clock. More specifically, the processor may determine, and verify, the age of the individual based on calculating a difference between the then current date maintained by the real time clock and the individual's date of birth.

Additionally or alternatively, the decoder may be configured to extract expiration date information of the ID card from the decoded data, and the processor may verify the age of the individual only on a condition that the ID card has not expired. The processor may determine that the ID card has not expired by comparing the date of expiration to the then current date maintained by the real time clock.

Additionally or alternatively, the processor may provide one of the deny signal or a signal indicating a request for manual verification of an age of the individual on a condition that the ID card has expired.

Additionally or alternatively, the processor may log a verification attempt record into a file. The verification attempt record may include a then-current date of verification attempt and a date of birth of the individual. The verification attempt record may further include at least one of a name of the individual, a date of expiration of the ID card, a gender of the individual, or a then-current time of verification attempt.

Additionally or alternatively, the barcode reader may include a communication interface configured to establish a connection with a host computer, wherein the processor may provide the date of birth information of the individual and expiration date information of the ID card to the host computer.

In accordance with another embodiment, there is provided a barcode reader (either a laser-based barcode reader or an image-based barcode reader), comprising a barcode detection system configured to capture a barcode pattern on an ID card of an individual presented within a field of view of the barcode reader; a decoder configured to generate decoded data from the barcode pattern and extract date of birth information from the decoded data; a communication interface configured to establish a connection with a host computer; and a processor configured to send the date of birth information to the host computer, receive a signal for age verification from the host computer, and provide either an approve signal or a deny signal based on the signal received from the host computer.

Additionally or alternatively, the processor may provide a signal indicating a request for manual verification of an age of the individual if the signal for age verification from the host computer indicates a requirement for manual verification of the age.

Additionally or alternatively, the processor may log a verification attempt record into a file. The verification attempt record may include a then-current date of verification attempt and a birth date of the individual. The verification attempt record may further include at least one of a name of the individual, a date of expiration of the ID card, a gender of the individual, or a then-current time of verification attempt.

Additionally or alternatively, the processor may distinguish between a barcode on a product and a barcode on an ID card and send a product ID extracted from decoded data of the barcode on the product to the host computer through a first communication interface if the barcode on the product is presented within the field of view of the barcode reader. The first communication interface may be a distinct communication interface from an interface to the host computer through which the barcode reader sends date of birth and other information decoded from an barcode on an individual's ID card.

In accordance with another embodiment, there is provided a barcode reading system, comprising: a barcode reader (either a laser-based barcode reader or an image-based barcode reader) configured to capture a pattern of a barcode presented within a field of view of the barcode reader; a host computer comprising a display screen and a processor executing a point of sale application; and at least one communication interface for communication between the barcode reader and the host computer, wherein the barcode reader is configured to extract a product ID encoded into a barcode on a product and send the product ID to the host computer via the at least one communication interface, wherein the host computer is configured to determine whether the product is an age-restricted product based on the product ID and prompt operation for age verification if the product is an age-restricted product, wherein the barcode reader is configured to capture a pattern of a barcode on an ID card of an individual presented within the field of view of the barcode reader, extract date of birth information from decoded data of the barcode on the ID card, and send the date of birth information to the host computer via the at least one communication interface, wherein the host computer is configured to calculate and verify an age of the individual from the date of birth information, and provide an age verification signal to the barcode reader, the age verification signal being either an approve signal if it is verified that the age of the individual is greater than a high threshold or a deny signal if it is verified that the age of the individual is less than a low threshold, the low threshold being distinct from, and lower than, the high threshold, and wherein the barcode reader is configured to provide either an approve signal or a deny signal based on the signal for age verification received from the host computer.

In one embodiment, the product ID may be sent to the host computer by a first communication interface and the date of birth information may be sent to the host computer by a second communication interface. The first communication interface may be, for example, a USB communication interface and the second communication interface may be, for example, a one-way or two-way serial communication interface (UART or Keyboard).

Additionally or alternatively, the barcode reader may be configured to send a NO read signal if the barcode reader is unable to provide the date of birth information to the host computer.

Additionally or alternatively, the host computer may be configured to block entering the date of birth information manually using a keyboard or a keypad if the operation for age verification is prompted; thereby requiring electronic entry of date of birth information.

Additionally or alternatively, the host computer may accept manual entry of the date of birth information on a condition that the ID card has expired or the barcode on the ID card cannot be decoded.

Additionally or alternatively, the host computer may be configured to log a verification attempt record into a file. The verification attempt record may include a then-current date of verification attempt and a date of birth of the individual. The verification attempt record may further include at least one of a name of the individual, a date of expiration of the ID card, a gender of the individual, or a then-current time of verification attempt.

In accordance with another embodiment, there is provided a method of using a barcode reading system (either a laser-based barcode reading system or an image-based barcode reading system) to verify an age of a purchaser of an age-restricted product, the method comprising: capturing a pattern of a barcode on an ID card presented to a barcode reader for verifying an age of an individual; decoding the pattern of the barcode to generate decoded data and extracting, from the decoded data, date of birth information of the individual; verifying an age of the individual from the date of birth information; and providing either: an approve signal if it is verified that the age of the individual is greater than a high threshold; or a deny signal if it is verified that the age of the individual is less than a low threshold, the low threshold being distinct from the high threshold.

Additionally or alternatively, the method further comprises providing a signal requesting manual verification of an age of the individual if it is verified that the age of the individual is between the low threshold and the high threshold.

Additionally or alternatively, the method further comprises providing a signal requesting manual verification of an age of the individual if the age of the individual cannot be verified from the decoded data.

Additionally or alternatively, the method further comprises extracting expiration date information of the ID card from the decoded data, wherein the deny signal or a signal requesting manual verification of an age is provided on a condition that the ID card has expired.

Additionally or alternatively, the method further comprises capturing a pattern of a barcode on a product presented to the barcode reader; extracting a product ID encoded into the barcode on the product; and determining whether the product is an age-restricted product based on the product ID, wherein the pattern of the barcode on the ID card of the individual is captured for age verification if the product is an age-restricted product.

Additionally or alternatively, the product ID may be sent to a host computer via a communication interface and the host computer may determine whether the product is the age-restricted product. The communication interface may be a first communication interface.

Additionally or alternatively, the method further comprises the barcode reader sending a NO read signal to the host computer via the communication interface if the barcode reader is unable to provide the date of birth information to the host computer. The communication interface via which date of birth from a barcode on an ID card or a NO read signal generated in response to inability to read a barcode on an ID card may be sent to the host computer via a second communication interface. The second communication interface may be different than the first communication interface. For example, the first communication interface may be a USB communication interface and the second communication interface may be a one-way or two-way serial communication interface (UART or Keyboard).

Additionally or alternatively, the method further comprises logging a verification attempt record into a file. The verification attempt record may include a then-current date of verification attempt and a date of birth of the individual. The verification attempt record may further include at least one of a name of the individual, a date of expiration of the ID card, a gender of the individual, or a then-current time of verification attempt.

Additionally or alternatively, the method further comprises providing the date of birth information of the individual and/or expiration date information of the ID card to a host computer, wherein the host computer calculates and verifies the age of the individual and sends an indication to the barcode reader, the indication indicating whether the barcode reader should provide the approve signal or the deny signal.

In accordance with another embodiment, there is provided a barcode reader, comprising: a barcode reading system (either a laser-based barcode reading system or an image-based barcode reading system) for capturing a barcode pattern of a barcode on an ID card of an individual presented within a field of view of the barcode reader; a decoder for generating decoded data from the barcode pattern and extracting date of birth information from the decoded data; a processor; and a code, executed by the processor, for verifying an age of the individual from the date of birth information, and providing either: an approve signal if it is verified that the age of the individual is greater than a high threshold; or a deny signal if it is verified that the age of the individual is less than a low threshold, the low threshold being distinct from, and lower than, the high threshold.

Additionally or alternatively, the barcode reader further comprises a code for providing a signal indicating a request for manual verification of an age of the individual if it is verified that the age of the individual is between the low threshold and the high threshold.

Additionally or alternatively, the barcode reader further comprises a code for providing a signal indicating a request for manual verification of an age of the individual on a condition that the age of the individual cannot be verified from the decoded data.

Additionally or alternatively, the barcode reader further comprises a code for extracting expiration date information of the ID card from the decoded data, and verifying the age of the individual on a condition that the ID card has not expired.

Additionally or alternatively, the deny signal or a signal indicating a request for manual verification of an age is provided on a condition that the ID card has expired.

Additionally or alternatively, the barcode reader further comprises a code for logging a verification attempt record into a file. The verification attempt record may include a then-current date of verification attempt and a date of birth of the individual. The verification attempt record may further include at least one of a name of the individual, a date of expiration of the ID card, a gender of the individual, or a then-current time of verification attempt.

In accordance with another embodiment, there is provided a barcode reader, comprising: a barcode reading system (either a laser-based barcode reading system or an image-based barcode reading system) for capturing a barcode pattern on an ID card of an individual presented within a field of view of the barcode reader; a decoder for generating decoded data from the barcode pattern and extracting date of birth information from the decoded data; at least one communication interface for establishing a connection with a host computer; a processor; and a code, executed by the processor, for sending the date of birth information to the host computer, receiving a signal for age verification from the host computer, and providing either an approve signal or a deny signal based on the signal for age verification received from the host computer.

Additionally or alternatively, the barcode reader further comprises a code for extracting a product ID encoded into a barcode on a product, sending the product ID to the host computer via the at least one communication interface, and sending the date of birth information to the host computer via at least one communication interface in response to a prompt for age verification operation from the host computer (or in response to reading a barcode on an ID card and determining date of birth information therefrom following a prompt for an ager verification operation from the host computer).

In one embodiment, the product ID may be sent to the host computer by a first communication interface and the date of birth information may be sent to the host computer by a second communication interface, distinct from the first communication interface. The first communication interface may be, for example, a USB communication interface and the second communication interface may be, for example, a one-way or two-way serial communication interface (UART or Keyboard).

Additionally or alternatively, the barcode reader further comprises a code for providing a signal indicating a request for manual verification of an age of the individual if the signal for age verification from the host computer indicates a requirement for manual verification of the age.

A number of features are described herein with respect to embodiments of the invention. It will be appreciated that features described with respect to a given embodiment also may be employed in connection with other embodiments.

DETAILED DESCRIPTION

The present disclosure provides a barcode reader and a barcode reading system that have an age verification capability.

Figure 1:
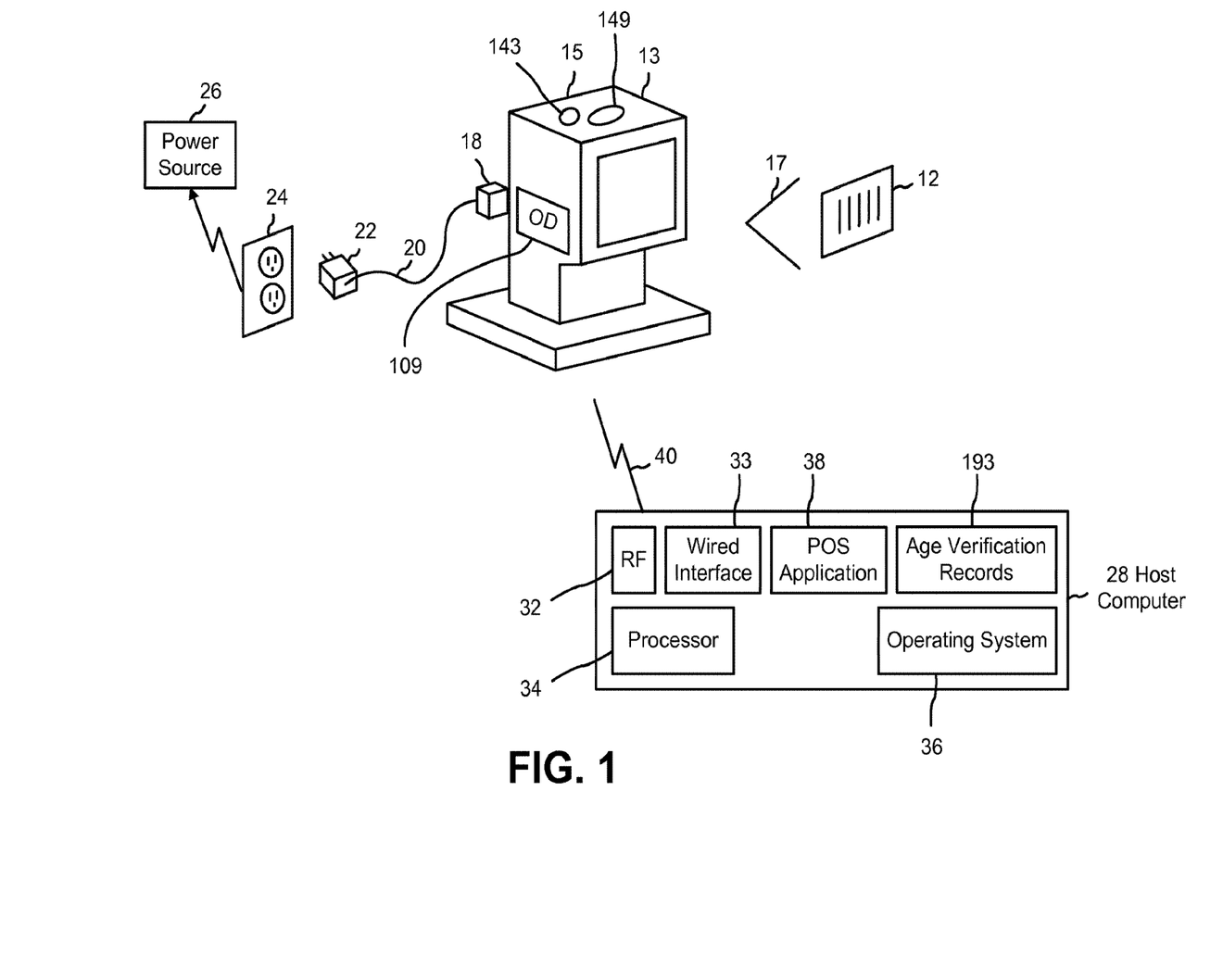
FIG. 1 depicts an example system including a barcode reader, embodied as a presentation barcode reader, and a host computer that are communicating over a wireless connection in accordance with one embodiment.

FIG. 1 depicts an example barcode reading system including a barcode reader 13 and a host computer 28 (i.e., a point of sale (POS) system) that are communicating over a wireless communication link 40 in accordance with one embodiment. It should be noted that FIG. 1 depicts a presentation barcode reader as an example, but any type of image-based barcode readers or laser-based barcode readers or scanners may be used. For example, the barcode reader may be a type of laser-based barcode reader or scanner referred to as an orbital presentation scanners. The barcode reader may be externally-powered or battery-powered, and may be a mobile device.

The barcode reader 13 may comprise a housing 15 which includes a stand or base configured for supporting the barcode reader 13 on a flat surface such that a field of view 17 of the barcode reader 13 extends towards the front of the barcode reader 13. The barcode reader 13 may read barcodes 12 which are presented to the barcode reader 13 by placement within the field of view 17.

In one embodiment, the barcode reading system (e.g. the image sensor, processor, illumination, or system package) may remain operational substantially the entire time the barcode reader 13 is coupled to a power source and powered "on" such that it may read a barcode 12 when the barcode 12 is presented to the barcode reader 13 by placement within the field of view 17.

In another embodiment, the barcode reader 13 may include an object detection system 109 which may remain operational substantially the entire time the barcode reader 13 is coupled to a power source and powered "on" such that when an object is within the field of view 17, the barcode reading systems may be activated to read the barcode 12. The object detection system 109 may itself have a field of view (not shown) that is within the central portion of the field of view 17.

The barcode reader 13 includes a power/data connector (not shown) to obtain operating power from an external power source 26. The power/data connector may be coupled to a mating connector 18 of a power cable 20. The power cable 20 may include or be coupled to a transformer 22 which converts ordinary AC power of 100V to 240V as provided by a power source 26 and available at a typical wall outlet 24 to DC power of a specific voltage (e.g., 5V) for powering the barcode reader 13.

The barcode reader 13 may also include a speaker 143 and/or an indication light 149. The speaker 143 and the indication light 149 may generate several different signals (e.g., three different sound patterns or three different colored lights) to render different information as to age verification results, which will be explained in detail below.

The host computer 28 includes a processor 34, a wireless interface 32 (which is labeled "RF" (radio frequency) in FIG. 1), a wired interface 33, an operating system 36, and a POS application 38. The POS application 38 running on the processor 34 may receive the decoded data of a barcode pattern (e.g., a barcode pattern on an ID card or a product) from the barcode reader 13 via the wireless interface 32 or the wired interface 33. The host computer 28 may be a mobile device.

Figure 2:
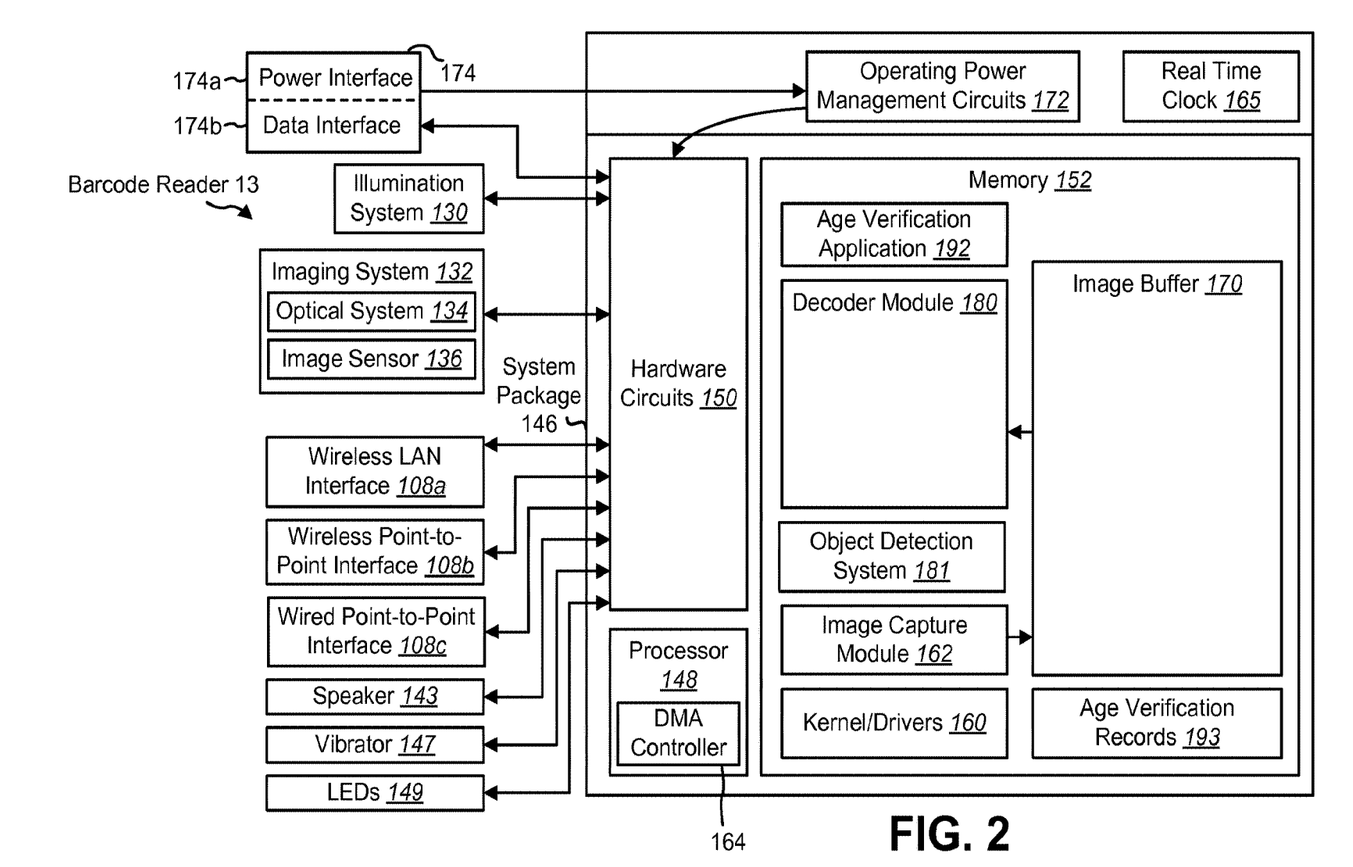
FIG. 2 depicts detailed components of the barcode reader in accordance with one embodiment.

FIG. 2 depicts detailed components of the barcode reader 13 in accordance with one embodiment. The barcode reader 13 may include an illumination system 130 and an imaging system 132. The illumination system 130 may be configured to illuminate a target area, which may include a barcode, while the imaging system 132 captures a barcode pattern. The illumination system 130 may include targeting illumination and one or more sets of exposure illuminators. The illumination system 130 may include multiple illumination systems as described in U.S. patent application Ser. No. 14/105,380 entitled "Barcode Reader Having Multiple Illumination Systems and Multiple Sets of Imaging Optics" filed on Dec. 13, 2013, the contents of which are hereby incorporated by reference. The imaging system 132 may include one or more optical systems 134 and one or more two-dimensional image sensors 136 (e.g., a camera). Each image sensor 136 may comprise a two-dimensional array of pixels and a detector capable of measuring or quantifying light incident on the pixel array. The image sensor 136 may be a charge coupled device (CCD) sensor, a complementary metal oxide semiconductor (CMOS) sensor, etc. Each optical system 134 may comprise a single lens or series of lenses capable of focusing light onto the image sensor 136.

The barcode reader 13 may further include one or more output devices that convey information to a user. Such output devices may include a speaker 143, a vibrator 147, and/or one or more indication lights 149 that illuminate in a manner visible to a user, such as one or more light emitting diodes (LEDs).

The barcode reader 13 may include one or more communication interfaces 108. More specifically, the barcode reader 13 may include a wireless LAN interface 108a, a wireless point-to-point interface 108b, and/or a wired point-to-point interface 108c.

The wireless LAN interface 108a may permit the barcode reader 13 to be an addressable endpoint of a wireless local area network and to communicate with a host computer 28 though a wireless LAN using, for example, Transmission Control Protocol/Internet Protocol (TCP/IP) or the like over a Wi-Fi (IEEE 802.11) and/or an Ethernet network or the like.

The wireless point-to-point interface(s) 108b may be a Bluetooth® interface protocol (IEEE 802.15), Wi-Fi Direct, or a similar point-to-point protocol to enable the barcode reader 13 to establish a wireless point-to-point connection link with, and communicate over the link with, a host computer 28.

The wired point-to-point interface(s) 108c may comprise a Universal Serial Bus (USB), a Universal Asynchronous Receiver/Transmitter (UART), or other point-to-point communication interface to enable the barcode reader 13 to establish a point-to-point connection with a host computer 28 using the cable 20 with multiple data conductors.

Both the barcode reader 13 and the host computer 28 may operate the wireless communication protocols (e.g., Bluetooth®, IEEE 802.11, or any other wireless communication protocols) to: i) establish one or more communication links between the wireless LAN interface 108a or wireless point-to-point interface 108b of the barcode reader 13 and the corresponding wireless interface 32 of the host computer 28, and ii) enable application-level communication between the barcode reader 13 and the host computer 28. In one embodiment, the application-level communication may be, for example, by way of Universal Serial Bus (USB) framing or emulation.

Each of the foregoing may be coupled to a system package 146. The system package 146 may comprise a single package or multiple packages. The system package 146 may include one or more silicon dies that include a processor 148, hardware circuits 150 for operating the components discussed above, and memory 152, which may be any combination of non-volatile memory or storage and volatile memory or storage. The non-volatile memory may include a combination of read-only memory (ROM) and/or flash memory.

The memory 152 may include a variety of modules that, when executed by the processor 148 of the barcode reader 13, enable the operation of the barcode reader 13. Such modules may include, for example, kernel/drivers 160, an image capture module 162, an image buffer 170, a decoder module 180, and an object detection system 181. These modules may be stored in any combination of volatile and non-volatile memories. Some modules may be stored in both volatile and non-volatile memories, for example, with permanent storage of the module in a non-volatile memory and a temporary copy stored in a volatile memory for execution. In addition to or as an alternative to these modules, the memory 152 may store any number of other modules including, but not limited to, those set forth in the patent applications incorporated by reference in this application.

The kernel/drivers 160 may include an operating system and/or an embedded kernel that drives the operation of the barcode reader 13. Further, the kernel/drivers 160 may include drivers for operating the various hardware components of the barcode reader 13.

The image capture module 162 may control the operation of the illumination system 130 and/or the imaging system 132 to capture two-dimensional images of objects with the barcode reader 13. The two-dimensional images may be stored in the image buffer 170. The image capture module 162 and/or other modules stored in the memory 152 may work in conjunction with a direct memory access (DMA) controller 164 of the processor 148. The DMA controller 164 may store data representing each image captured by the image capture module 162 in the memory 152 at an appropriate addressable storage space such that the processor 148 may subsequently attempt to process and/or decode the image.

The image buffer 170 may store the images captured by the image capture module 162. The image buffer 170 may be in a random access memory (RAM) component (i.e., volatile memory component) of the memory 152.

The decoder module 180 may be used to undertake processing and decoding of an image of a barcode captured by the image capture module 162. The decoder module 180 may determine whether a symbol exists within the image, identify the type of barcode present in the image, and decode the barcode to extract the desired data (for example, barcode data).

In more detail, the decoder module 180 may decode each barcode to generate raw character data. If the barcode is of a format consistent with the format of barcodes on ID Cards (e.g. PDF-417) the barcode may be treated as an ID card and decoded data output by the decoder module 180 in one of several ways.

First, the decoder module 180 may output the raw character data in the same manner as it would for any other PDF-417 barcode without any further evaluation of whether the PDF-417 barcode is an ID card barcode and without any formatting of any particular data. The raw character data may be further processed by the barcode reader 13 as described herein or output to the host computer 28 over the communication interface for further processing as described herein.

In another aspect of operation, the decoder module 180 may output an indication of the individual's age and/or date of birth for further processing by the barcode reader 13 as described herein or output to the host computer 28 over the communication interface for further processing as described herein. In this mode of operation the decoder module 180 may perform additional tests to determine that the raw character data is consistent with raw character data from an ID card barcode.

The first test is to determine whether the raw character data is at least 21 characters in length which is the minimum size of an AAMVA standard driver license barcode. If the raw character data is fewer than 21 characters the barcode cannot be an ID card barcode.

The second test is to determine whether the character string "ANSI" or "AAMVA" is located within the raw character data at a location that would be considered a header of an AAMVA barcode. Again, if the character string "ANSI" or "AAMVA" is not located at such a location within the raw character data then the barcode cannot be an ID card barcode.

If the result of both tests is positive the decoder module 180 may: i) search the raw character data for the standard AAMVA three character data tag "DBA" to identify and buffer the date of birth; ii) search the raw character data for the standard AAMVA three character data tag "EBA" to identify and buffer the date of expiration; and ii) output both to an operating kernel of the barcode reader in either CCYYMMDD or MMDDCCYY format for further processing by the barcode reader In another aspect of operation, the decoder module 180 may output all of the information within the ID card barcode for further processing by the barcode reader 13 as described herein or output to the host computer 28 over the communication interface for further processing as described herein. In this mode of operation the decoder module 180 may perform the same additional tests as described above to determine that the raw character data is consistent with raw character data from an ID card barcode.

After performing such tests and determining that the raw character data is consistent with data that would be obtained from reading an ID card barcode, the decoder module 180 will initially extract and buffer information from the portion of the raw data that would be the header of the ID card barcode. That information may include an Issuer Identification Number (IIN) and an AAMVA version number. The header may further includes the offset and length for each sub file. The offset and length is used to locate the AAMVA standard three character data tag and corresponding data for each data element within the standard sub files. The data for each data element is extracted and buffered in a predetermined buffering position such that the data element can be identified by position within the buffer instead of by the three character data tag. The offset and length of any state specific sub file may be used to buffer the entire sub file as a single binary object.

The decoder module 180 then determines the required output formatting to be used for output of the data for further processing by the barcode reader 13 or the host computer 28. As part of configuring the decoder module 180 for reading ID card barcodes an administrator may configure which data elements to output, the order of those data elements, and the delimitation between the data elements. The three character data tags are not necessarily included within formatted output. Data elements are identified by the configured location within the formatted output file.

The decoder module 180 may also be configured to output corrected raw character data—which means the same format as the raw character data (including the three character data tags within the raw character data) with the characters modified from the original raw character data to correct errors which are capable of being corrected through the process described herein.

The barcode reader 13 may include an age verification application 192 which receives the output from the decoder module 180. The age verification application 192 performs an age verification operation, which will be explained in detail below. The barcode reader 13 may also include a real time clock 165 which keeps track of the current date and time and may perform the age verification operation using the value of the real time clock 165. Age verification records 193 may be stored in the barcode reader 13, which will be explained in detail below.

The barcode reader 13 may also include operating power management circuits 172 and a power/data interface 174. The power/data interface 174 may be a combined power and data connector with a power interface 174a and a data interface 174b. The power interface 174a is coupled to the operating power management circuits 172 and the data interface 174b is coupled to the applicable driver of the hardware circuits 150.

The operating power management circuits 172 may receive, from an external power source 26 (in FIG. 1) through the power interface 174a, all (or substantially all) power required for operating the barcode reader 13 (i.e., powering each element represented in FIG. 2) as the power is used for powering the barcode reader 13. The barcode reader 13 may not include a battery for operation, and the external power received by the operating power management circuits 172 may be used for operating the barcode reader 13 (i.e., powering the systems shown in FIG. 2) at substantially the same time as it is received from the external power source 26. The operating power management circuits 172 may include power conversion circuitry to convert operating power received from an external power source 26 into multiple operating power levels and provide an appropriate power level to different components of the barcode reader 13. Alternatively, the barcode reader may receive the operating power from a battery.

As described in FIG. 1, even though the barcode reader 13 receives its operating power from an external power source 26 through a cable 20 and the power/data interface 174, the barcode reader 13 may utilize a wireless communication link 40 for communicating decoded data to a host computer 28.

The barcode reading system including the barcode reader 13 and the host computer 28 has an age verification capability. In one embodiment, the barcode reader 13 may verify the age of an individual (e.g., a purchaser of an age-restricted product) by capturing, and decoding, a barcode pattern on an identification (ID) card of the individual presented within a field of view of the barcode reader and extracting date of birth information from the decoded data. For example, when a purchaser wants to purchase an age-restricted product (i.e., a product that requires a certain minimum age to purchase), the barcode reader 13 may verify the age of the purchaser by determining the age of the purchaser from the date of birth information extracted from the barcode pattern on the ID card of the purchaser and comparing the determined age with thresholds. Alternatively, instead of determining the age of the individual, the barcode reader 13 may verify the age of the individual by comparing the date of birth extracted from the decoded barcode on the ID card to the threshold dates for age verification. The ID card includes any card that includes a barcode pattern in which the information that can verify the age or date of birth of the individual is encoded (e.g., a customer loyalty card).

The barcode reader 13 may then provide either an approve signal or a deny signal based on verification of the age of the individual. For example, two different age thresholds, a high threshold and a low threshold, may be defined, and an approve signal may be provided if it is verified that the age of the individual is greater than a high threshold, and a deny signal may be provided if it is verified that the age of the individual is less than a low threshold.

In an alternative embodiment, the age verification may be performed by the host computer 28. The barcode reader 13 may provide the date of birth information of the individual extracted from the barcode pattern on an ID card of the individual to the host computer 28, and the host computer may verify the age of the individual and send a signal for age verification to the barcode reader 13.

Figure 3:
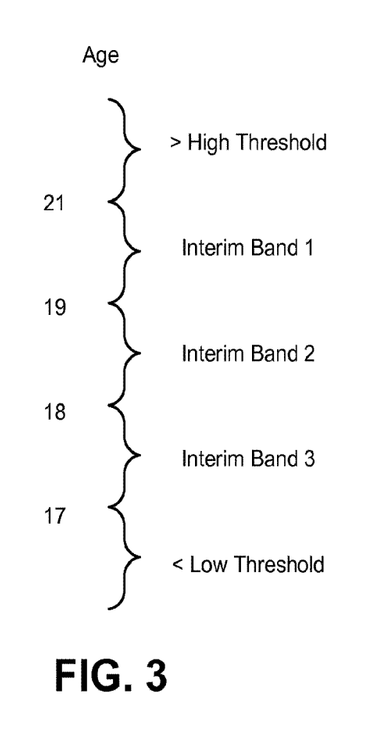
FIG. 3 shows example thresholds and age bands for age verification in an environment where a different age thresholds are required for different age restricted products.

FIG. 3 shows example thresholds and age bands for age verification. For example, the high threshold may be set to 21 and the low threshold may be set to 17. One or more interim age bands may be set between the high threshold and the low threshold and different actions may be performed depending on the determined age band. The thresholds may be set to threshold dates.

Figure 4:
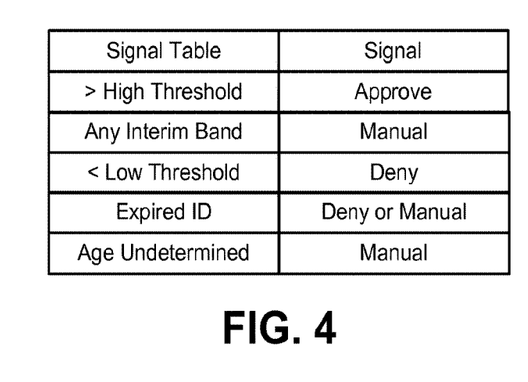
FIG. 4 is a table which maps the determined age and ID status to one of the output signals.

FIG. 4 is an example table which maps the verified age and ID status to one of the output signals. An approve signal may be generated if it is verified that the age of the individual is greater than a high threshold, and a deny signal may be generated if it is verified that the age of the individual is less than a low threshold. A signal indicating a request for manual verification of an age of the individual may be generated if it is verified that the age of the individual belongs to between the high threshold and the low threshold. A signal indicating a request for manual verification of an age of the individual may be generated if the processor of the barcode reader 13, or alternatively the host computer 28, cannot verify the age of the individual from the decoded data of the barcode pattern on the ID card of the individual.

The barcode reader 13 may extract expiration date information of the ID card from the decoded data of the barcode pattern on the ID card, and may determine whether the ID card has expired or not. The barcode reader 13 may then generate the deny signal or a signal indicating a request for manual verification of an age of the individual if the ID card has expired. Alternatively, the barcode reader 13 may send the expiration date information to the host computer 28, and the host computer 28 may determine whether the ID card has expired or not.

The barcode reader 13 may include a real time clock 165 for maintaining a current date value, and may verify the age of the individual or the status of the ID card expiration based on the real time clock 165.

Figure 6:
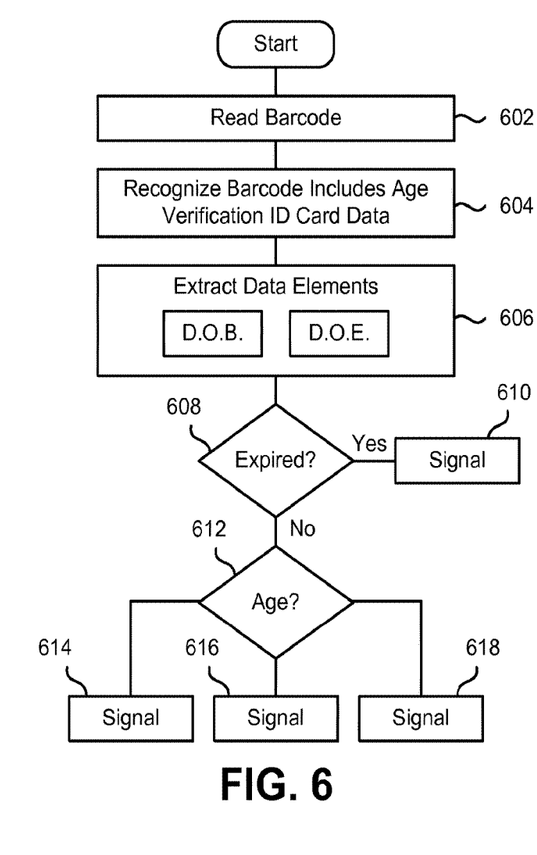
FIG. 6 is a flow chart of an age verification operation of a barcode reader in accordance with one embodiment.

FIG. 6 is a flow chart of an age verification operation of a barcode reader 13 in accordance with one embodiment. Step 602 represents reading a barcode pattern on an ID card of an individual. The ID card is presented in the field of view 17 of the barcode reader 13 and the barcode pattern is captured and decoded by the barcode reader 13. The barcode reader 13 recognizes that the barcode includes age verification ID card data (i.e., date of birth information) at step 604. The barcode reader 13 then extracts date of birth information at step 606. The barcode may include date of expiration information of the ID card. In such a case, the barcode reader 13 also extracts the date of expiration information of the ID card at step 606. The barcode reader 13 determines whether the ID card has expired based on the date of expiration information at step 608. If the ID card has expired, the barcode reader 13 may render a signal indicating expiration of the ID card and a request for manual verification of age of the individual at step 610. Alternatively, the barcode reader 13 may render a deny signal if the ID card has expired.

If the ID card has not expired, the barcode reader 13 verifies the age of the individual at step 612. For example, the barcode reader 13 may determine the age of the individual from the date of birth information and compare it with thresholds (e.g., the high threshold and the low threshold) at step 612. Alternatively, the barcode reader 13 may compare the date of birth of the individual to threshold dates. The barcode reader 13 then generates and renders a corresponding signal depending on the age verification result at steps 614-618. More specifically, if it is verified that the age of the individual is greater than a high threshold, an approve signal may be rendered at step 614. If it is verified that the age of the individual is less than a low threshold, a deny signal may be rendered at step 616. If it is verified that the age of the individual falls between the high threshold and the low threshold, a signal indicating a request for manual verification of an age may be rendered at step 618. A signal indicating a request for manual verification of an age of the individual or a deny signal may be rendered if the barcode reader cannot verify the age of the individual from the decoded data of the barcode pattern on the ID of the individual. The different signals (the approve signal, the deny signal, and the signal requesting manual entry of date of birth information) may be rendered by different sound patterns or indication lights.

Figure 7:
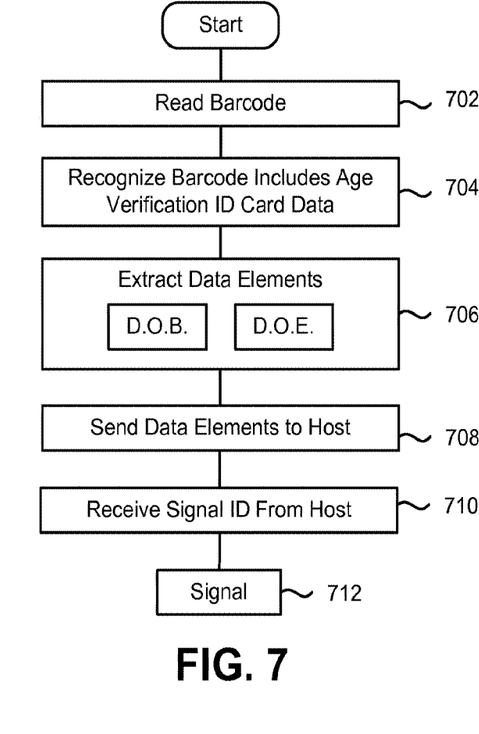
FIG. 7 is a flow chart of an age verification operation of a barcode reader in accordance with another embodiment where the barcode reader sends date of birth and date of expiration information to the host computer and receives back an indicator of what signal to render.

FIG. 7 is a flow chart of an age verification operation of a barcode reader 13 in accordance with another embodiment where the barcode reader 13 sends date of birth and/or date of expiration information to the host computer 28 and receives back an indicator of what signal to render. Step 702 represents reading a barcode pattern on an ID card of an individual. The ID card is presented in the field of view of the barcode reader 13 and the barcode pattern is captured and decoded by the barcode reader 13. The barcode reader 13 recognizes that the barcode includes age verification ID card data (i.e., date of birth information) at step 704. The barcode reader 13 then extracts date of birth information at step 706. The barcode may include date of expiration information of the ID card. In such a case, the barcode reader 13 also extracts the date of expiration information of the ID card at step 706. The barcode reader 13 then sends the date of birth information or both the date of birth information and the date of expiration information to the host computer 28 at step 708.

The host computer 28 then performs the age verification operation (not shown in FIG. 7). The host computer 28 may determine whether the ID card has expired based on the date of expiration information. If the ID card has expired, the host computer 28 may generate a deny signal or a signal indicating a request for manual entry of the date of birth of the individual. If the ID card has not expired, the host computer 28 verifies the age of the individual based on the thresholds (e.g., the high threshold and the low threshold). If it is verified that the age of the individual is greater than the high threshold, an approve signal may be generated. If it is verified that the age of the individual is less than the low threshold, a deny signal may be generated. If it is verified that the age of the individual falls between the high threshold and the low threshold, a signal indicating a request for manual verification of an age may be generated. A signal indicating a request for manual verification of an age of the individual or a deny signal may be generated if the host computer 28 cannot verify the age of the individual from the decoded data of the barcode pattern on the ID of the individual. The host computer 28 then sends a signal indicating age verification results (i.e., an approve signal, a deny signal, or a signal requesting manual entry of date of birth information) to the barcode reader 13.

The barcode reader 13 receives the signal for age verification from the host computer 28 at step 710. The barcode reader 13 then renders an approve signal, a deny signal, or a signal indicating a request for manual verification of the age based on the signal received from the host computer 28 at 712.

Figure 8:
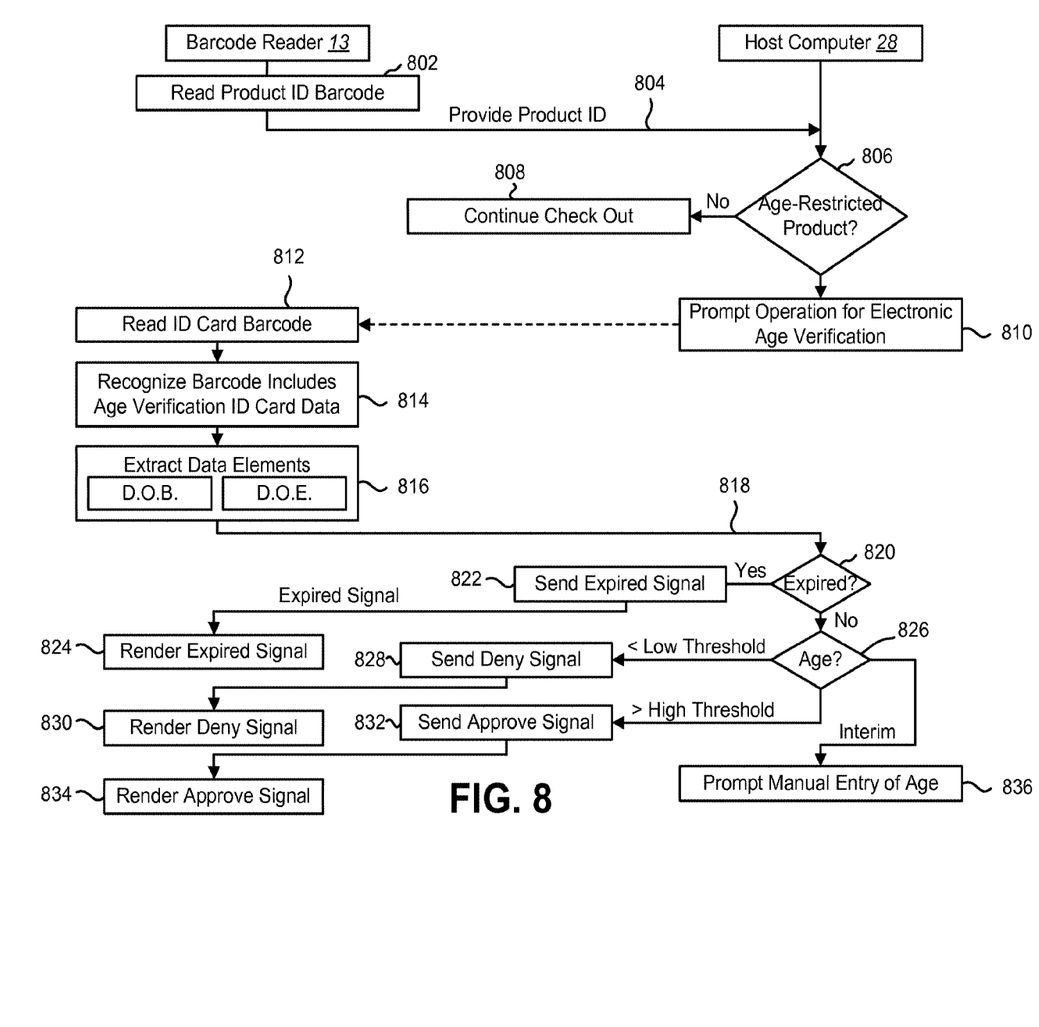
FIG. 8 is a flow chart of an operation of a barcode reader and a host computer for age verification in accordance with another embodiment where age determination is made by the host computer.

FIG. 8 is a flow chart of an operation of a barcode reader 13 and a host computer 28 for age verification in accordance with another embodiment where age determination is made by the host computer 28. Step 802 represents that a barcode reader 13 captures and decodes a product ID barcode on a product that is presented in a field of view 17 of the barcode reader 13, and decodes the product ID barcode to extract a product ID. The barcode reader 13 then provides the product ID to a host computer 28 at step 804. The host computer 28 determines whether the product is an age-restricted product (i.e., a product that requires a certain minimum age to purchase) based on the product ID at step 806. If it is determined that the product is not an age-restricted product, a check out process continues at step 808.

If it is determined that the product is an age-restricted product at step 806, the host computer 28 prompts 810 operation for electronic age verification. The barcode reader 13 then reads a barcode pattern on an ID card of an individual (i.e., the purchaser of the product) at step 812. The ID card is presented in the field of view 17 of the barcode reader 13 and the barcode pattern is captured and decoded by the barcode reader 13. The barcode reader 13 recognizes that the barcode includes age verification ID card data (i.e., date of birth information) at step 814. The barcode reader 13 then extracts date of birth information at step 816. The barcode may include date of expiration information of the ID card. In such a case, the barcode reader 13 also extracts the date of expiration information of the ID card at step 816. The barcode reader 13 then sends the date of birth information or both the date of birth information and the date of expiration information to the host computer 28 at step 818.

The host computer 28 may determine whether the ID card has expired at step 820. If the ID card has expired, the host computer 28 sends a signal indicating expiration of the ID card (i.e., a signal indicating a request for manual entry of date of birth information, or alternatively a deny signal) to the barcode reader 13 at step 822, and the barcode reader 13 may render the signal received from the host computer 28 at step 824.

If the ID card has not expired, the host computer 28 then performs the age verification operation. For example, the host computer 28 may determine the age of the individual from the date of birth information and compare the determined age with the thresholds (i.e., the high threshold and the low threshold) at step 826. Alternatively, the host computer 28 may compare the date of birth to the threshold dates. If it is verified that the age of the individual is less than a low threshold, the host computer 28 sends a deny signal to the barcode reader 13 at step 828, and the barcode reader 13 renders the deny signal at step 830. If it is verified that the age of the individual is greater than a high threshold, the host computer 28 sends an approve signal to the barcode reader 13 at step 832 and the barcode reader 13 renders the approve signal at step 834. If it is verified that the age of the individual falls between the high threshold and the low threshold, the host computer 28 prompts manual entry of an age of the individual at step 836. If the age of the individual cannot be verified from the decoded data of the barcode pattern on the ID of the individual, the host computer 28 may send a signal indicating a request for manual verification of an age of the individual or a deny signal to the barcode reader 13.

Figure 5:
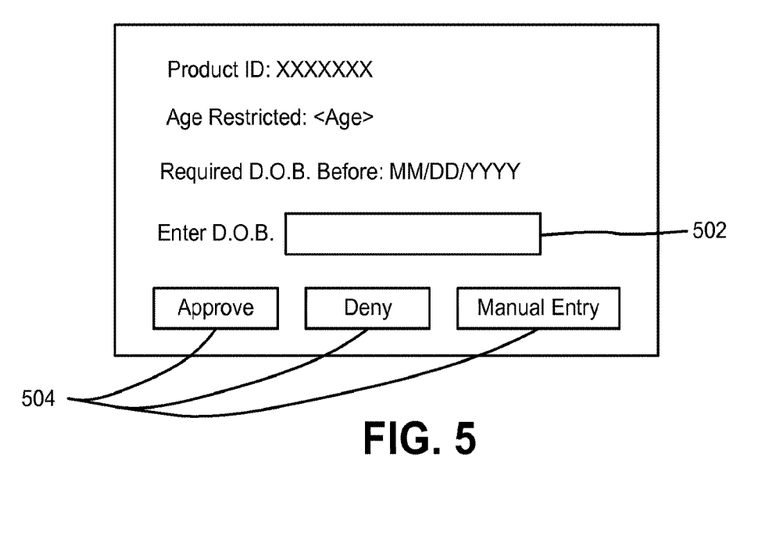
FIG. 5 is an example display rendered by the point of sale (POS) system for indicating approval or denial or for requiring electronic entry of a date of birth.

FIG. 5 is an example display rendered by the host computer 28 (i.e., the POS system) for indicating approval or denial, or requiring electronic entry of a date of birth. The display may show the product ID, the restricted age for purchasing the product, the required birth date to purchase the product, and an input window 502 for manually entering the date of birth of the individual. The display may also include signals 504 indicating approve, deny or manual entry.

The host computer (i.e., the POS system) can be configured to require electronic entry of the birth date of an individual (e.g., a purchaser of an age-restricted product) by reading the barcode pattern on the ID card of the individual. For example, when the screen (for example, as shown in FIG. 5) comes up for entry of the date of birth of the individual, it can be configured to not allow keyboard or keypad entry by the clerk but instead require the clerk to operate the barcode reader to read the individual's ID card. For example, the input window 502 on the display for entering the birth date may be disabled staying, for example, in grey color.

Manual entry of the date of birth may be allowed in the event that the ID card cannot be read or has expired. The POS system may prompt for manual entry in those cases. The POS system may also require a manager to do the manual entry (e.g., with entry of a manager password).

Figure 9:
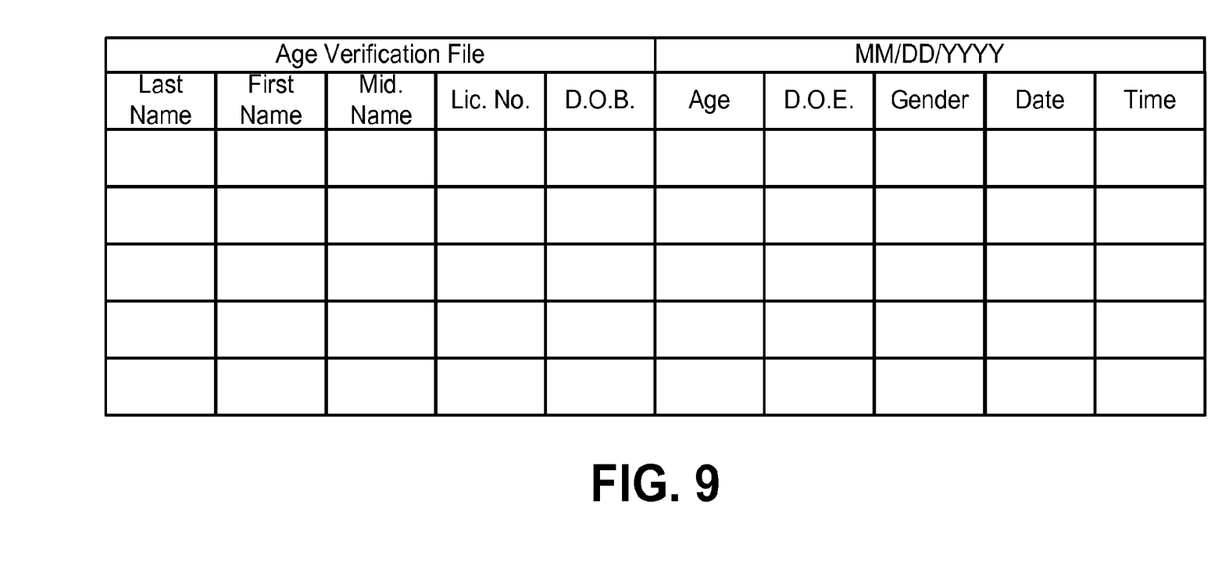
FIG. 9 is a table representing storage of age verification records.

FIG. 9 is a table representing storage of age verification records. The age verification records may be stored in the barcode reader 13 or in the host computer 28. In one embodiment, as the barcode pattern on the ID card is scanned by the barcode reader 13, the processor 148 in the barcode reader 13 may log verification attempt records into a file. The verification attempt records may include a then-current date of verification attempt and a birth date of the individual. The verification attempt record may also include at least one of a name of the individual, a date of expiration of the ID card, a gender of the individual, a then-current time of verification attempt, or the like, as shown in FIG. 9. Alternatively, the verification attempt records may be stored in the host computer 28.

Figure 10A:
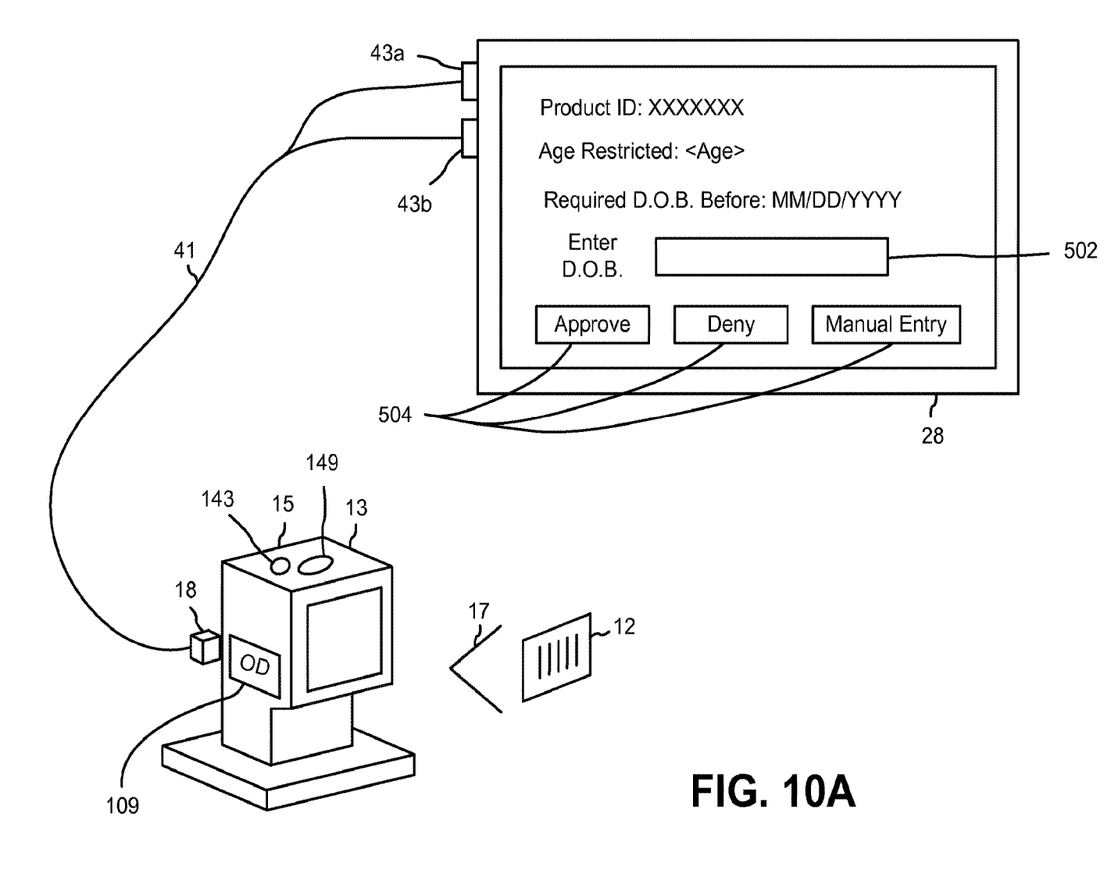
FIG. 10a depicts an example system including a barcode reader, embodied as a presentation barcode reader, and a host computer that are communicating over two wired communication interfaces.

FIG. 10a depicts an example barcode reading system including a barcode reader 13 and a host computer 28 (i.e., a point of sale (POS) system) that are communicating over two wired communication interfaces 43a and 43b in accordance with one embodiment. It should be noted that FIG. 10a, like FIG. 1, depicts a presentation barcode reader as an example, but any type of image-based barcode readers or laser-based barcode readers or scanners may be used. For example, the barcode reader may be a type of laser-based barcode reader or scanner referred to as an orbital presentation scanners. The barcode reader may be externally-powered or battery-powered, and may be a mobile device.

The barcode reader 13 may comprise all of the components as previously discussed with respect to FIGS. 1 through 9 and function as previously discussed with respect to FIGS. 1 through 9. Alternatively, or additionally, the power/data connector (not shown) to which mating connector 18 couples may be an RJ-50 female connector with the mating connector 18 being an RJ-50 male connector. The RJ-50 connector supports ten connections.

The host computer 28 may comprise all of the components as previously discussed with respect to FIGS. 1 through 9 and function as previously discussed with respect to FIGS. 1 through 9, including the POS application 38 providing the user interface as described with respect to FIG. 5. Alternatively, or additionally, the host computer 28 may include two hardwired communication interface connectors, one being a USB connector 43a and the other being a DB9 connector 43b.

A first hardwired communication interface between the barcode reader 13 and the host computer 28 may be a USB interface supported between the USB connector 43a on the host computer 28 and four pins of the RJ-50 connector on the barcode reader 13.

A second hardwired communication interface between the barcode reader 13 and the host computer 28 may be a one way or two way serial communication interface supported between the DB9 connector 43b on the host computer 28 and six pins of the RJ-50 connector on the barcode reader 13.

In one exemplary mode of operation the barcode reader 13 provides the product ID, obtained from decoding a barcode on a product, to the host computer 28 using a first communication interface such as the USB communication interface. The barcode reader 13 may be configured such that decoded data from any barcode of a first barcode format (such as UPC) may be treated as a product ID and provided to the host computer using the first communication interface.

Additionally, or alternatively, the barcode reader 13 may provide data decoded from an ID card to the host computer 28 using a second communication interface such as the serial communication interface. The barcode reader 13 may be configured such that decoded data from any barcode which has certain characteristics consistent with the characteristics of a barcode on an ID card may be treated as decoded data from an ID card and provided to the host computer using the second communication interface. Exemplary characteristics of a barcode on an ID card include: i) the barcode format is PDF-417; ii) the barcode size is at least characters in length; and iii) the barcode includes a specific character sequence within a certain location within the character sequence.

Figure 10B:
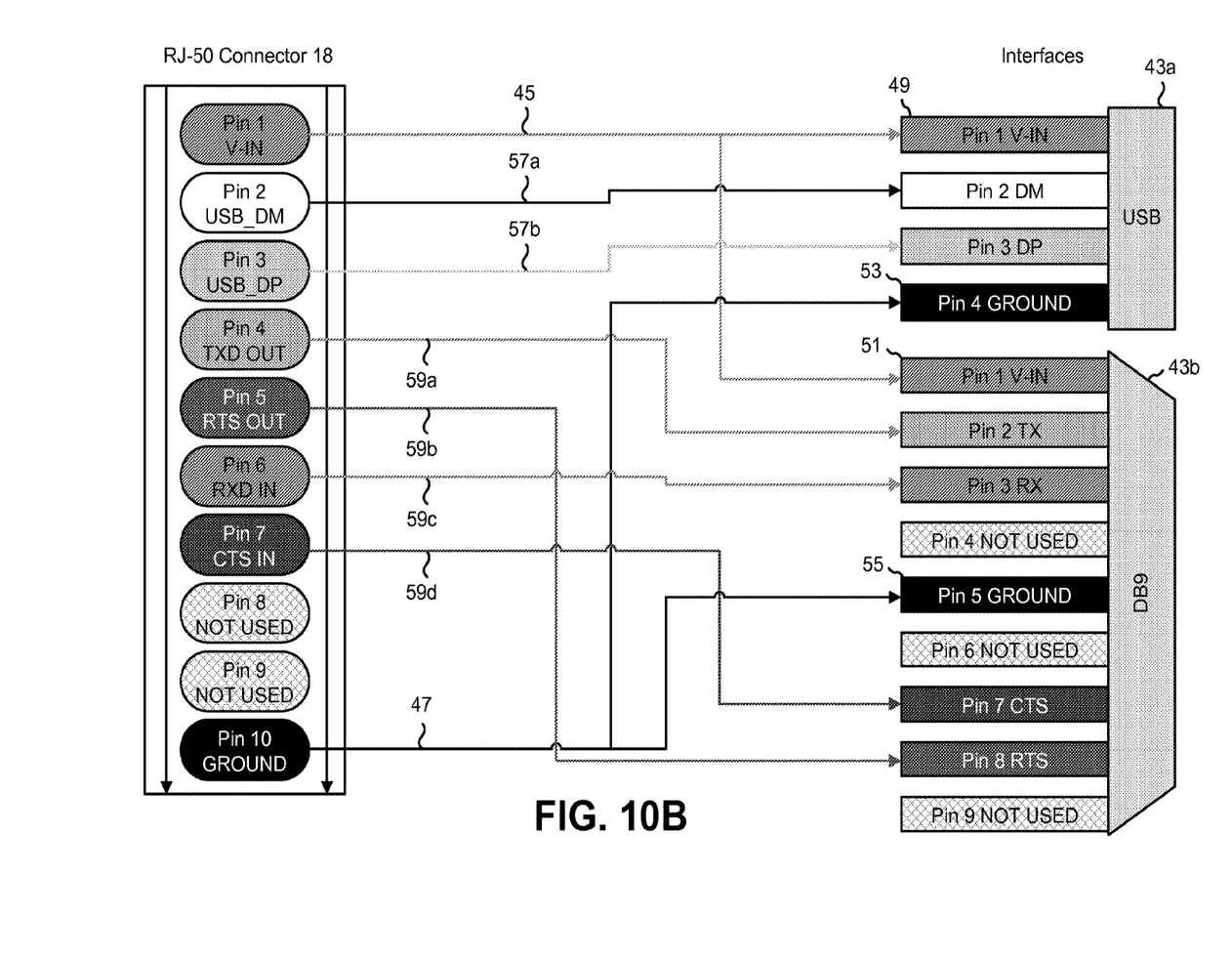
FIG. 10b depicts a multiple-conductor communication cable supporting communication between the barcode reader and the host computer over two wired communication interfaces.

FIG. 10b is a block diagram depicting a multiple-conductor communication cable supporting communication between the RJ-50 connector 18 coupled to the barcode reader 13 and the two connectors 43a, 43b of the host computer 28.

The USB communication interface is supported by 4 conductors: i) conductor 45 and 47 being power and ground respectively; and ii) conductors 57a and 57b being USB_DM and USB_DP respectively.

The serial communication interface is supported by 6 conductors: i) conductor 45 and 47 being power and ground respectively; and ii) conductors 59a, 59b, 59c, and 59d being TXD OUT, RTS OUT, RXD IN, AND CTS IN respectively. It should be noted that the power and ground conductors 45 and 47 couple to both: i) power and ground 49 and 53 of the USB connector; and ii) power and ground 51 and 55 of the DB9 connector such that operating power from the host computer 28 may be provided to the barcode reader 13 over the cable 41 by providing the power on either the power and ground 51 and 55 of the DB9 connector or power and ground 49 and 53 of the USB connector.

One or more of the features, functions, procedures, operations, components, elements, structures, etc. described in connection with any one of the configurations described herein may be combined with one or more of the functions, procedures, operations, components, elements, structures, etc. described in connection with any of the other configurations described herein, where compatible.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes and variations may be made in the arrangement, operation and details of the implementations described herein without departing from the scope of the claims.

What is claimed is:

1. A barcode reader, comprising:
   a barcode detection system configured to capture a barcode pattern on an identification (ID) card of an individual presented within a field of view of the barcode reader;
   a decoder configured to generate decoded data from the barcode pattern and extract date of birth information from the decoded data;
   a communication interface configured to establish a connection with a host computer; and
   a processor configured to send the date of birth information to the host computer, receive a signal for age verification from the host computer, and provide either:
   i) an approve signal if the signal for age verification from the host computer indicates that the age of the individual is greater than a high threshold; or
   ii) a deny signal if the signal for age verification from the host computer indicates that the age of the individual is less than a low threshold, the low threshold being distinct from the high threshold.

2. The barcode reader of claim 1, wherein the processor is configured to provide a signal indicating a request for manual verification of an age of the individual if the signal for age verification from the host computer indicates a requirement for manual verification of the age.

3. The barcode reader of claim 1, wherein the processor is configured to log a verification attempt record into a file.

4. The barcode reader of claim 3, wherein the verification attempt record includes a then-current date of verification attempt and a birth date of the individual.

5. The barcode reader of claim 4, wherein the verification attempt record includes at least one of a name of the individual, a date of expiration of the ID card, a gender of the individual, or a then-current time of verification attempt.

6. The barcode reader of claim 1, wherein the processor is further configured to distinguish between a barcode on a product and a barcode on an ID card and send a product ID extracted from decoded data of the barcode on the product to the host computer if the barcode on the product is presented within the field of view of the barcode reader.

7. The barcode reader of claim 6, wherein the product ID is sent to the host computer via a first communication interface between the barcode reader and the host computer and the date of birth information is sent to the host computer via a second communication interface between the barcode reader and the host computer.

8. A barcode reading system, comprising:
   a barcode reader configured to capture a pattern of a barcode presented within a field of view of the barcode reader;
   a host computer comprising a display screen and a processor executing a point of sale application; and
   a communication interface for communication between the barcode reader and the host computer,
   wherein the barcode reader is configured to extract a product identification (ID) encoded into a barcode on a product, and send the product ID to the host computer via the communication interface,
   wherein the host computer is configured to determine whether the product is an age-restricted product based on the product ID and prompt operation for age verification if the product is an age-restricted product,
   wherein the barcode reader is configured to capture a pattern of a barcode on an ID card of an individual presented within the field of view of the barcode reader, extract date of birth information from decoded data of the barcode on the ID card, and send the date of birth information to the host computer,
   wherein the host computer is configured to verify an age of the individual from the date of birth information, and provide an age verification signal to the barcode reader, the age verification signal being either an approve signal if it is verified that the age of the individual is greater than a high threshold or a deny signal if it is verified that the age of the individual is less than a low threshold, the low threshold being distinct from the high threshold, and
   wherein the barcode reader is configured to provide either: i) an approve signal if the age verification signal provided by the host computer is an approve signal; or ii) a deny signal if the age verification signal provided by the host computer is a deny signal.

9. The barcode reading system of claim 8, wherein the barcode reader is configured to send a NO read signal if the barcode reader is unable to provide the date of birth information to the host computer.

10. The barcode reading system of claim 8, wherein the host computer is configured to block entering the date of birth information manually using a keyboard or a keypad if the operation for age verification is prompted.

11. The barcode reading system of claim 8, wherein the host computer accepts manual entry of the date of birth information on a condition that the ID card has expired or the barcode on the ID card cannot be decoded.

12. The barcode reading system of claim 8, wherein the host computer is configured to log a verification attempt record into a file.

13. The barcode reading system of claim 12, wherein the verification attempt record includes a then-current date of verification attempt and a birth date of the individual.

14. The barcode reading system of claim 13, wherein the verification attempt record includes at least one of a name of the individual, a date of expiration of the ID card, a gender of the individual, or a then-current time of verification attempt.

15. A barcode reader, comprising:
   a barcode reading system for capturing a barcode pattern on an identification (ID) card of an individual presented within a field of view of the barcode reader;
   a decoder for generating decoded data from the barcode pattern and extracting date of birth information from the decoded data;
   a communication interface for establishing a connection with a host computer;
   a processor; and
   a code, executed by the processor, for sending the date of birth information to the host computer, receiving a signal for age verification from the host computer, and providing one of: i) an approve signal if the signal for age verification from the host computer indicates that an age of the individual is greater than a threshold, ii) a deny signal based on the signal for age verification received from the host computer, or iii) a signal indicating a request for manual verification of the age of the individual if the signal for age verification from the host computer indicates a requirement for manual age verification.

16. The barcode reader of claim 15, further comprising a code for extracting a product ID encoded into a barcode on a product, sending the product ID to the host computer, and sending the date of birth information to the host computer in response to a prompt for age verification operation from the host computer.

17. The barcode reader of claim 16, wherein the product ID is sent to the host computer via a first communication interface between the barcode reader and the host computer and the date of birth information is sent to the host computer via a second communication interface between the barcode reader and the host computer.

* * * * *